O. G. ERICKSON.
INTERNAL COMBUSTION ENGINE.
APPLICATION FILED JAN. 14, 1919.

1,366,448.

Patented Jan. 25, 1921.

3 SHEETS—SHEET 1.

WITNESSES
J. P. Schrott

INVENTOR
Oscar G. Erickson.
BY
ATTORNEYS

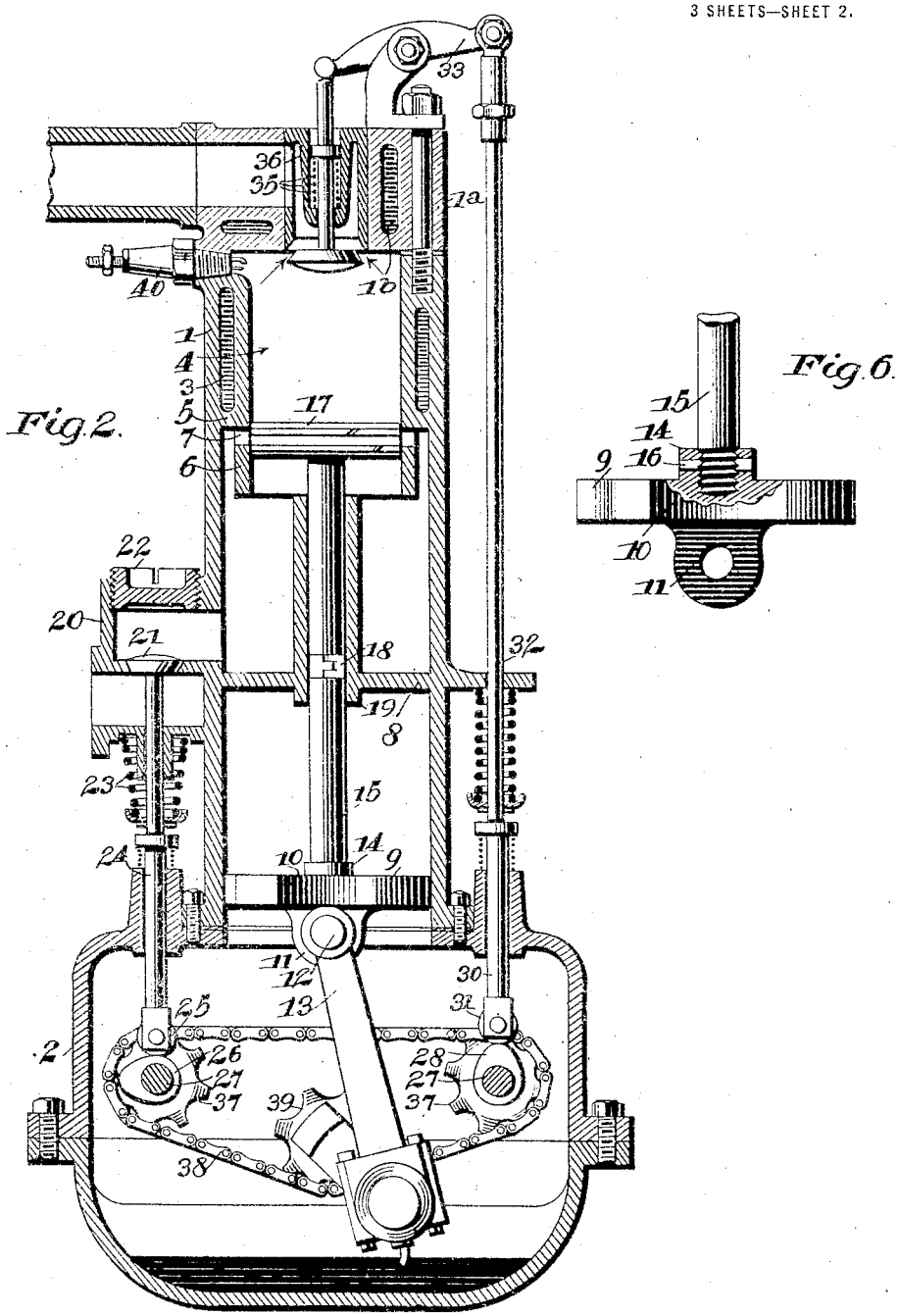

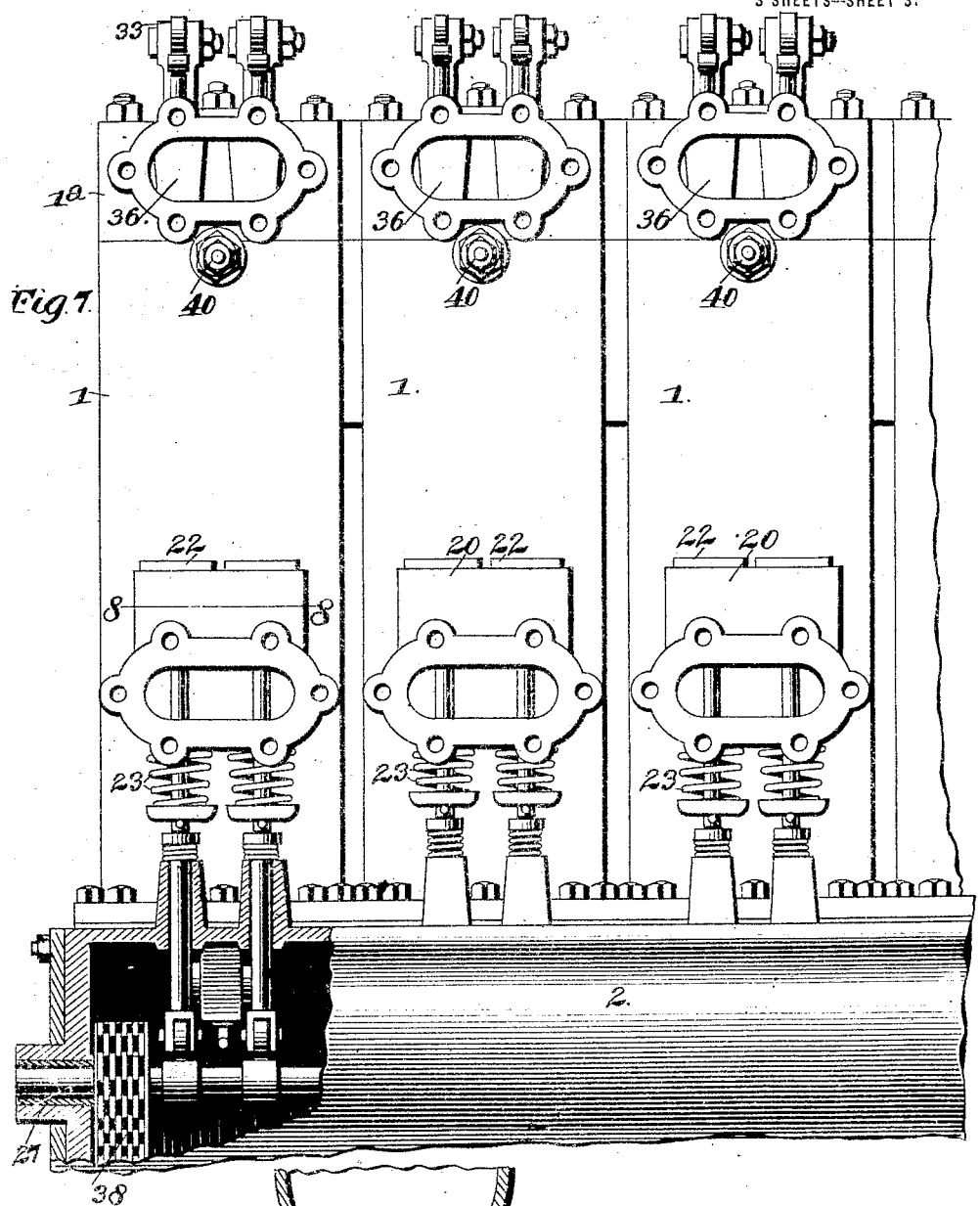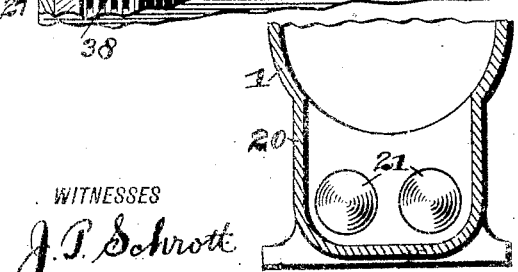

UNITED STATES PATENT OFFICE.

OSCAR G. ERICKSON, OF DETROIT, MICHIGAN.

INTERNAL-COMBUSTION ENGINE.

1,366,448.  Specification of Letters Patent.  Patented Jan. 25, 1921.

Application filed January 14, 1919. Serial No. 271,100.

*To all whom it may concern:*

Be it known that I, OSCAR G. ERICKSON, a citizen of the United States, and a resident of Detroit, in the county of Wayne and State of Michigan, have invented certain new and useful Improvements in Internal-Combustion Engines, of which the following is a specification.

My invention relates to improvements in internal combustion engines, and it consists in the constructions, combinations and arragements herein described and claimed.

An object of my invention is to provide a two-cycle internal combustion engine, embodying the novel combination of piston structure and by-pass arrangement whereby the fresh gas is initially compressed and becomes the agent whereby the gas of the previously burnt charge is expelled, said precompressed gas serving to lift the burnt gas out bodily by virtue of being admitted through the by-passes from the bottom.

A further object of the invention is to provide an engine of the class described, having as one of its important features, a dual arrangement of intake and exhaust valves, by the use of which the gas is enabled to pass with greater facility.

Other objects and advantages will appear in the following specification, reference being had to the accompanying drawings in which:—

Figure 1:
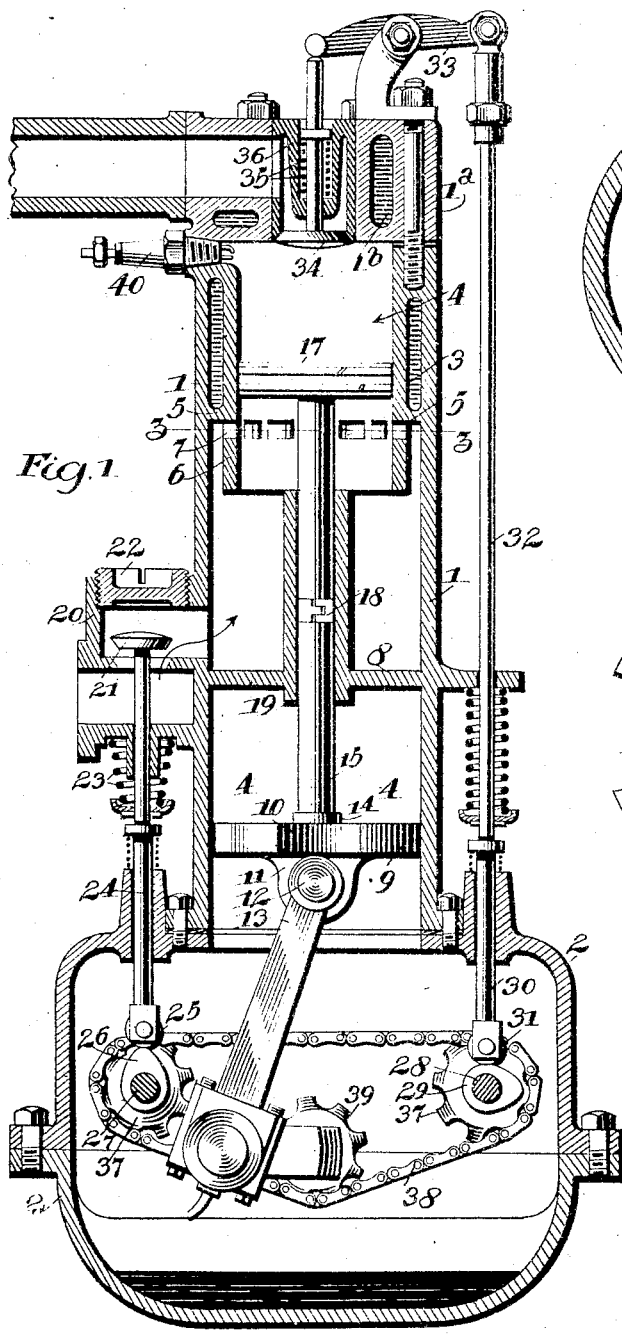
Figure 3:
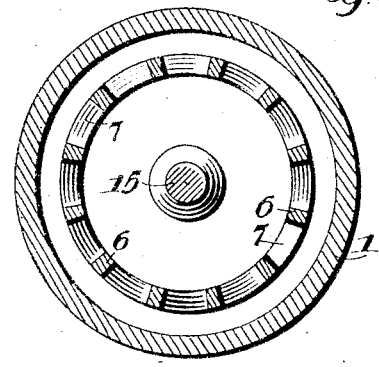
Figure 4:
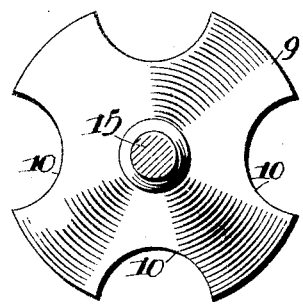
Figure 5:
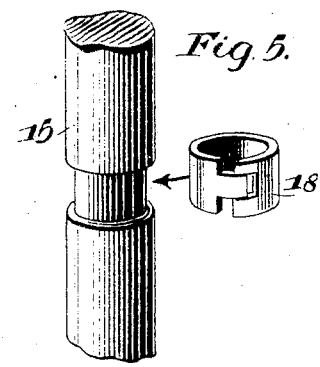

Figure 1 is a vertical section of an engine constructed in accordance with my invention, showing the working piston moving on the compression stroke, Fig. 2 is a similar view, illustrating the position of the parts just before the opening of the by-pass ports near the end of the explosion stroke, Fig. 3 is a cross section on the line 3—3 of Fig. 1, illustrating the circumferentially arranged by-pass ports, Fig. 4 is a cross section on the line 4—4 of Fig. 1, showing the construction of the guide piston, Fig. 5 is a detail perspective view of a part of the piston rod and packing ring, Fig. 6 is a detail view partly in section, showing how the piston rod is secured to the guide piston, Fig. 7 is a partial side elevation of the engine, showing three of the four cylinders and revealing a part of the crank case structure, and Fig. 8 is a cross section on the line 8—8 of Fig. 7.

My improved engine is in the present instance of the two-cycle type, and may be constructed in as many cylinders as may properly be determined in actual practice. It will be observed in Fig. 7, that by way of example the engine is constructed in four cylinders. Since the construction and operation of one cylinder will be the same in description as all of the cylinders, only one cylinder will be described in the specification.

Referring then to Fig. 1, the cylinder 1 is mounted on the crank case 2 by means of the flange and bolt connections shown and now almost universally employed in the art. A water jacket 3 extends down far enough from the top of the cylinder 1, to cover and protect the upper explosion chamber 4.

It will be observed that in the present instance, the cylinder 1 remains the same diameter from the bottom to the top, and that the part which forms the explosion chamber 4 is concentrically located on the inside. A web 5 joins the explosion cylinder with the engine cylinder 1, and defines the bottom of the water jacket.

The explosion cylinder 4 however, extends below the web 5 into a circular skirt 6. The skirt 6 has a plurality of narrowly separated by-pass ports 7, through which the precompressed fresh gas rushes on being uncovered by the working piston, to bodily expel the burnt gas in the working chamber 4, from the bottom.

The cylinder head 1ª in which the exhaust valves are mounted, is affixed to the cylinder by any suitable means, as for example the stud bolts shown. The water jacket 3 is continued in the cylinder head as shown at 1ᵇ.

A partition 8 divides the engine cylinder 1 substantially in the middle below the web 5. The part above the partition 8 is the gas chamber in which the fresh gas is precompressed. The part of the cylinder below the partition simply serves as a guide or runway for the guide piston 9.

A plurality of cut out portions 10 in the piston 9, permits the passage of air through the piston as it reciprocates thus preventing the compression of air at either side and consequently avoiding the retardation to the motion that would otherwise result.

The guide piston 9 has lugs 11 on the bottom. The wrist pin 12 secures the upper end of the connecting rod 13 to the guide piston.

A collar 14 on top of the guide piston, has a threaded socket into which the lower end of the piston rod 15 is screwed and additionally secured by means of a pin 16. Obviously the attachment of the piston rod to the guide piston, may be effected by other means well known in the art. The working piston 17 is attached to the upper end of the piston rod 15 and operates in the working cylinder 4 as shown.

A wide brass ring 18 is fitted in a groove on the piston rod 15, and the piston rod reciprocates in a sleeve 19 on the partition 8. The brass sleeve is sufficient to hold the compression in the gas chamber. Oil in sufficient quantities will keep the piston rod in smooth running order in the sleeve 19 because this engine will be lubricated by the splash system which insures the spreading of oil spray to all exposed parts, excepting the piston 17 which will have to be oiled either by a forced feed or mixing oil with the gasolene.

Formed at one side of the engine cylinder 1 is the gas inlet 20. There is a dual arrangement of both the intake and exhaust valves. The intake valves 21 are accessible by the valve caps 22. The stem of each valve extends through the bottom of the inlet, and on the exposed part, is provided with a spring 23 by means of which the valve is normally seated.

Each valve is operated by a tappet 24 which extends into the crank case, and has a roller 25 that rides on the companion intake cam 26. The cam shaft 27 carries a separate cam for each of the tappets, and the purpose of the dual valve arrangement is, to produce a larger opening when the valves are opened, and thus facilitate the entrance of the gas.

An exhaust valve cam shaft 28 is located on the other side of the crank case. The arrangement of the exhaust cams 29 is the same as that of the intake cams. Each tappet 30 has a roller 31 that rides on the cam 29, and the tappet operates the valve rod 32 which is pivoted to the rocker arm 33 at the top. The rocker arm in turn actuates the exhaust valve 34.

There is also a dual arrangement of the exhaust valve 34 as indicated by the double operating connections in Fig. 7. A spring 35 concealed in part in the cage 36 in which the two exhaust valves 34 operate, keeps each of the exhaust valves normally seated.

Each cam shaft carries a sprocket 37 over which a silent chain 38 runs. The silent chain is also applied to a sprocket 39 on the crank shaft, so that as the crank shaft revolves, both cam shafts are revolved at the same speed. A spark plug 40, preferably located in the side of the cylinder, ignites the compressed charges of gas in the working chamber at the proper time.

Briefly reviewing the operation, the dual intake and exhaust cams open the dual intake the exhaust valves at the proper times in the operation of the engine. Gas is admitted into the gas chamber when the working piston 17 moves on the inward or compression stroke. The valves 21 close at just about the time when the working piston reaches the limit of its inward movement.

The gas in the gas chamber is compressed when the working piston 17 moves on the explosion or working stroke. The compression continues up to the instant of the uncovering of the uppermost parts of the by-pass ports 7, when the precompressed gas rushes into the working chamber from all sides and pushes out the residue of the previously burnt charge, from the bottom.

The exhaust valves 35 are mechanically opened just prior to the instant of the uncovering of the ports 7, and closed at about the time the ports 7 are again covered on the inward stroke of the piston. At this time the intake valves 21 are mechanically opened and remain open until the piston has completed its inward stroke. The circumferential arrangement of the ports 7 in the skirt 6, is a distinct advantage in that the precompressed gas enters from all sides and thereby more thoroughly expels the burnt gas.

While the construction and arrangement of the engine herein described and claimed is that of a generally preferred form, obviously modifications and changes may be made without departing from the spirit of the invention or the scope of the claims.

I claim:—

1. An internal combustion engine, comprising a cylinder, a working cylinder arranged concentrically in the top, including a circular skirt with a circumferential series of by-pass ports, a partition across the cylinder forming a gas chamber, a working piston operating in the working cylinder, a mechanically operated intake valve, opened to admit fresh gas into the gas chamber when the piston performs a compression stroke, and a mechanically operated exhaust valve in the top of the working cylinder, opened approximately when the piston uncovers the by-pass ports, the circumferential arrangement of said ports admitting the gas compressed in the gas chamber by the outward movement of said piston, simultaneously from all sides to insure the expulsion of the residue of the burnt gas.

2. An internal combustion engine, comprising a cylinder, a working cylinder arranged concentrically in the top, defining a water jacket and including a circular skirt below the water jacket with a circumferential series of by-pass ports, a partition across the cylinder forming a gas chamber, a working piston operating in the working cylinder, a mechanically operated intake valve, opened to admit fresh gas into the gas chamber when the piston performs a compression stroke, a mechanically operated exhaust valve in the top of the working cylinder, opened approximately when the piston uncovers the by-pass ports, the circumferential arrangement of said ports admitting the gas compressed in the gas chamber by the outward movement of said piston, simultaneously from all sides to insure the expulsion of the residue of the burnt gas, and means for guiding the working piston, comprising a piston rod with a piston ring, a sleeve on the partition for the piston rod and ring, and a guide piston operating in the engine cylinder below the partition, with cut out portions to permit the passage of air.

3. The combination of an engine cylinder, a working cylinder located on the inside at the top and joined thereto by a web, said cylinder having a skirt extending below the web and provided with a circumferential series of narrowly spaced by-pass ports; a double piston comprising a working piston operating in the working cylinder, a guide piston operating in the lower part of the engine cylinder with cut out portions to permit the passage of air, and a piston rod connecting the two pistons; a partition across the engine cylinder defining a gas chamber and having a sleeve for the piston rod, a gas inlet having a part communicating with the gas chamber and a part communicating with a carbureter, an intake valve operating in the inlet, a cam for raising the valve, an exhaust valve in the top of the working cylinder, a cam for operating said valve, cam shafts for both cams, and means including sprocket and chain connections for driving the cam shafts from the crank shaft of the engine.

OSCAR G. ERICKSON.